UNITED STATES PATENT OFFICE.

TORGUY ALBIN EKLUND, OF STOCKHOLM, SWEDEN.

METHOD OF RECOVERING TIN FROM STANNIFEROUS WASTE PRODUCTS.

1,359,494. Specification of Letters Patent. Patented Nov. 23, 1920.

No Drawing. Application filed February 5, 1920. Serial No. 356,412.

*To all whom it may concern:*

Be it known that I, TORGUY ALBIN EKLUND, subject of the King of Sweden, residing at 7 Drottningholmsväyen, Stockholm, Sweden, have invented certain new and useful Improvements in Methods of Recovering Tin from Stanniferous Waste Products, of which the following is a specification.

One has hitherto, for recovering tin from stanniferous waste products, for instance tin-plate, employed two different groups of methods, one being based upon the use of gaseous agents, for instance, chlorin, for recovering the tin, and the other on the use of liquid solvents and electrolysis of the solutions obtained. The first mentioned group of methods is very troublesome and is open to the objection that always appears when great quantities of gaseous agents are used in practice, namely great losses due to leakage, unsoundness etc. The second group is very dependent on the solvent employed. If alkalis are used as solvents there are difficulties in electrolyzing the solution since after some time the precipitation of tin becomes incomplete and finally stops due to increasing of the tension. If acids be used as solvents, iron and other metals are also dissolved and precipitated whereby an impure tin is obtained.

According to said methods only such waste products have been treated that contain tin in metallic state.

My present invention refers to a method which makes possible the recovering of tin from products that do not contain tin in the metallic state, but in the form of sulfids, oxy-chlorids etc. Such products are tin-putty, tin-slime and other waste products from tinning factories, tin-shops, etc., and have a very high percentage of tin varying between 30 and 70%. Due to the fact that these products are difficult to dissolve, it has hitherto not been possible to recover tin from the same in economical way.

My present invention is characterized by first dissolving such waste products that do not contain tin in metallic state, such as tin-putty, in hydrochloric acid (of, say 1.15 to 1.2 specific gravity) in the presence of an oxidizing agent, such as saltpeter, chlorin etc., and at an elevated temperature, and in then reducing the solution of stannic chlorid thus obtained to stannous chlorid by means of tin waste containing tin in metallic state, for instance tin-plate, and in electrolyzing the solution of stannous chlorid thus obtained.

In the practical execution of the method the dissolving of the tin-putty or the like at an increased temperature is preferably performed in a vessel of stone or earthen ware which is placed within a bigger wooden vessel containing water which is heated by means of steam. The hydrochloric acid ought to be used in a relatively high degree of concentration, suitably 1.12 sp. gravity. In the subsequent electrolysis of the solution of stannous chlorid one may advantageously use electrodes of carbon, scrap tin or iron-tin (an alloy of iron and tin which is formed in the tinning-pots of tin shops and which is infusible for which reason it cannot be molded). The advantage of using scrap tin as anodes consists in the tin contained in the same being dissolved during the electrolysis, whereby it will be possible to maintain the concentration of the bath for a considerably longer time than if carbon anodes be used. This scrap tin can be coupled as anode in such a manner that the same is placed in flat wooden baskets into which descend carbon rods hanging on the anode rod. Said carbon rods thus form the direct coupling between the positive pole and the scrap tin, which itself forms the anode. As cathodes ordinary sheet iron, sheet tin or other metal may be used.

During the electrolysis the tension may be held very low (about 0.5–1 volt) since the bath is saturated with tin salts. According as the bath becomes poorer of tin, the resistance of the bath is augmented and from this reason the tension must at the end of the process be increased to about 2 volts. When this tension has been attained it is convenient to remove the bath which then contains most of the tin in the form of stannic chlorid and augment its contents of tin by using the same as solvent for tin-putty and the like, the excess of acid in the bath in the presence of chlorin or other oxidizing agent again dissolving the tin to stannic chlorid which is then reduced to stannous chlorid by means of tin-plate or the like, after which this solution is electrolyzed. After the starting of the process the used electrolyte will consequently be used as the solvent.

The process offers the following advantages over other methods:

1. It makes possible the recovering of tin from tin-putty and similar wastes containing tin as compounds which are difficult to dissolve, for instance as sulfids, oxychlorids etc. The dissolving of such compounds is rendered possible by using a relatively strong acid at an elevated temperature and in the presence of oxidizing agents, such as chlorin, saltpeter, etc. The acid used must, however, not be so strong that it becomes dangerous to health.

2. The reduction of stannic chlorid to stannous chlorid is performed by means of waste products containing the tin in metallic state, such as tin-plate, whereby the tin contained in the same is recovered without the necessity of using a special solvent.

3. The method can be executed at very low cost, which is principally due to the fact that the waste electrolyzing baths poor in tin compounds are used as solvent for tin-putty and the like, since the baths after the electrolysis contain sufficient quantities of free acid and free chlorin for dissolving fresh quantities of tin-putty. From this reason the consumption of acid will be very low. When during the electrolysis the level of the bath sinks due to leakage and other losses these losses are covered by adding hydrochloric acid.

4. The electrolysis gives a very high electrolytic efficiency (about 2 grams per ampere hour) and can be performed very easily since as low a tension as 0.5–1 volt can be used. From this reason the tin is obtained as big well developed crystals, while in hitherto employed methods the tin is precipitated as spongy tin which melts only at 700–800° C. thereby causing an oxidizing loss of 30–40%. The crystalline tin obtained according to the present invention melts at 215° C. at which temperature no oxidizing takes place, the oxidizing temperature being about 400° C. The big well developed crystals do not contain any impurities, such as iron, lead etc. which are usually present in spongy tin that contains about 10% of impurities. The tin obtained in the present case contains according to analysis 99.99% $Sn$.

I claim:

1. The method of recovering tin from stanniferous waste products which comprises dissolving such tin waste that contains the tin as sulfids, oxychlorids or other non metallic compounds in relatively concentrated hydrochloric acid in the presence of oxidizing agents and at elevated temperatures, reducing the stannic chlorid in the solution thus obtained to stannous chlorid by treating such solution with tin waste containing tin in metallic state and electrolyzing the solution of stannous chlorid thus obtained.

2. In a method as stated in claim 1, the step of treating the waste electrolzing baths with tin waste containing tin in non metallic state, reducing the stannic chlorid obtained to stannous chlorid by means of tin waste containing tin in the metallic state.

3. In the treatment of tin waste products, the improvement which comprises treating tin waste containing non-metallic tin with a solvent liquid comprising hydrochloric acid and an oxidizer, then treating the resulting liquor containing stannic chlorid with tin waste containing metallic tin, whereby the stannic chlorid is reduced to stannous chlorid.

In testimony whereof I have affixed my signature in the presence of two witnesses.

TORGUY ALBIN EKLUND.

Witnesses:
 TVAR JOHANSSON,
 ELAF LARSSAN.

It is hereby certified that the name of the patentee in Letters Patent No. 1,359,494, granted November 23, 1920, for an improvement in "Methods of Recovering Tin from Stanniferous Waste Products," was erroneously written and printed as "Torguy Albin Eklund," whereas said name should have been written and printed as *Torgny Albin Eklund;* and that the said Letters Patent should be read with this correction therein that the same may conform to the record of the case in the Patent Office.

Signed and sealed this 25th day of January, A. D., 1921.

[SEAL.] L. B. MANN,

*Acting Commissioner of Patents.*

Cl. 204—7.